United States Patent
De Nichilo

(10) Patent No.: US 6,450,793 B1
(45) Date of Patent: Sep. 17, 2002

(54) THERMOFORMING STATION FOR MOLDING SHEET PLASTICS MATERIALS WITH A QUICK COOLING SYSTEM FOR THE THERMOFORMED ARTICLES

(75) Inventor: Giorgio De Nichilo, Brescia (IT)

(73) Assignee: Gam Impianti S.A., Lugano (CH)

( * ) Notice: Subject to any disclaimer, the term of this patent is extended or adjusted under 35 U.S.C. 154(b) by 0 days.

(21) Appl. No.: 09/268,232

(22) Filed: Mar. 15, 1999

(30) Foreign Application Priority Data

Apr. 3, 1998 (IT) .......................................... MI98A0723

(51) Int. Cl.[7] .......................... B29C 35/16; B29C 51/18
(52) U.S. Cl. ...................... 425/73; 425/384; 425/387.1; 425/388; 264/544; 264/554
(58) Field of Search ................................. 264/547, 554, 264/544, 737; 425/387.1, 73, 384

(56) References Cited

U.S. PATENT DOCUMENTS

| | | | |
|---|---|---|---|
| 3,258,813 A | 7/1966 | Groth et al. | 18/19 |
| 4,811,550 A | 3/1989 | Hautemont | 53/478 |
| 5,620,715 A | 4/1997 | Hart et al. | 425/143 |

*Primary Examiner*—Jan H. Silbaugh
*Assistant Examiner*—Edmund H. Lee
(74) *Attorney, Agent, or Firm*—Bucknam and Archer

(57) ABSTRACT

A thermoforming station and method for molding a sheet-like plastics material provide to use a bell element including a cover which can be opened on a sidewall in order to provide a large opening for ventilating and cooling the molded plastics material thereby reducing up to 50% the time conventionally required for making a thermoformed evenly cooled product.

10 Claims, 8 Drawing Sheets

THERMOFORMING STATION FOR MOLDING SHEET PLASTICS MATERIALS WITH A QUICK COOLING SYSTEM FOR THE THERMOFORMED ARTICLES

BACKGROUND OF THE INVENTION

The present invention relates to a thermoforming station including a quick cooling system for quickly cooling the molded products.

The invention also relates to a thermoforming method carried out in the inventive thermoforming station.

More specifically, the present invention relates to a thermoforming station of the type in which a sheet-like plastics material (supplied in plate or coil form) is molded within a bell-shaped molting element arranged at a location opposite to the mold supporting element, thereby said bell element can be closed on the latter.

As is known, in such a thermoforming station, the sheet-like plastics material is brought to the plasticizing temperature thereof and then being locked, at a set molding position, by closing said bell element against the perimetrical edge of the plastics material itself. Then, a vacuum or negative pressure is provided inside said bell element, so as to draw the plastics material into said bell element, to provide the plastics material a pre-stretched ball shape. Under the thus formed ball a mold element is then arranged, while reversing the vacuum direction thereby causing the plastics material to be pressed and adhere to the mold, for the molding operation proper.

Then, the molded plastics material is allowed to cool, the bell element being held in a closed condition to hold the molded article being cooled on the mold. Thus, suitcase shells, motor vehicle components, refrigerator cells and doors, bath furniture pieces and the like are made.

In this prior molding method, the cooling operation represents the most critical step since the outer surface of the molded articles must be cooled as evenly as possible in order to prevent inner stresses from undesirably deforming the molded article.

Moreover, the cooling step represents the longest step of the method and, in order to increase the yield, the cooling time should be as short as possible.

On the other hand, the achievement of the above two objectives is hindered by the provision of the mentioned bell element which, as stated, during the cooling period must be held in a closed condition on the plastics material applied on the mold.

For providing a ventilation through the plastics material surface facing the inside of the bell element, the latter is conventionally provided with a plurality of large openings which can be tightly closed during the under vacuum-operations. Inside the bell element is moreover conventionally provided a channel pattern for ejecting pressurized air jets against the surface of the plastics material to be cooled. For this reason, the air outlet openings of the bell element must have a size larger than that of the inlet openings thereby the bell element will be provided with a perforated construction having a lot of smaller and larger openings. The number of these openings, in particular, will depend on the cooling efficiency to be achieved. In this connection, however, it should be apparent that the number of said openings cannot be increased to any desired value, since for a very large number of openings, it would be required to design a lot of expensive sealing elements requiring, furthermore, an intensive maintenance (also considering the comparatively high operating temperature of the bell element).

SUMMARY OF THE INVENTION

Accordingly, the aim of the present invention is to provide a thermoforming station of the above mentioned type, which is specifically adapted to cool in a very quick manner the molded plastics material or articles.

Within the scope of the above mentioned aim, a main object of the present invention is to provide such a thermoforming station allowing to carry out therein a molding process requiring a small molding operating time while providing molded articles free of any inner stresses due to a uneven cooling of the surfaces of the molded articles.

Another object of the present invention is to provide such a thermoforming station allowing an efficient circulation of air through the plastics material arranged inside the thermoforming bell element, while allowing said thermoforming bell element to have a comparatively simple construction.

Yet another object of the present invention is to provide a thermoforming station of the above mentioned type which, differently from conventional thermoforming stations requires a very reduced maintenance, while providing a cooling system very resistant against wear and high operating temperatures.

Yet another object of the present invention is to provide such a thermoforming station allowing an improved thermoforming method to be quickly carried out therein.

According to one aspect of the present invention, the above mentioned aim and objects, as well as yet other objects, which will become more apparent hereinafter, are achieved by a thermoforming station for molding a sheet-like plastics material, of the type comprising a mold and a bell element for closing said mold, and being essentially characterized in that said bell element comprises a disassemblable or openable construction adapted to provide a lot of ventilating and cooling openings for ventilating and cooling said plastics material arranged in said thermoforming station.

According to further features of the present invention, said station is moreover provided with driving means for opening said bell element during the cooling of said plastics material and closing said bell element during the hot molding operations of said plastics material. Said driving means are moreover designed for holding said plastics material on said mold, even with the bell element in an open condition for the cooling operations.

The thermoforming station according to the invention is further characterized in that said bell element comprises a side wall and a movable panel which can be closed as a cover on said side wall.

Said driving means for opening and closing said bell element comprise, in turn, a cylinder-piston assembly which is connected, on a side, to said movable panel and, on the other side, to said wall.

According to yet further features of the invention, said thermoforming station comprises moreover side guide elements, preferably of a pinion-rack type, provided for sliding on sliding column and adapted to center the movement of said movable panel and wall of said bell element with respect to one another and to the mold. Means for locking the plastics material on the mold rigid with the edge of said side wall of said bell element, opposite to the engagement edge thereof with said movable panel, are moreover provided.

The thermoforming station according to the present invention is furthermore characterized in that it comprises driving cylinders for raising or opening, in a lockable manner, said wall of said bell element. A fan assembly for providing and orienting air jets inside said bell element, as it is opened by at least one of the mentioned opening driving means is moreover provided.

According to yet further features of the thermoforming station according to the present invention, said thermoforming station is moreover provided with additional ventilating and cooling openings, formed through said side walls of said bell element. On said side wall are moreover provided a plurality of driving cylinders for driving said side wall with respect to said mold, as well as a pressurized air channel arranged inside said bell element and aiding for cooling said plastics material, and a reduction assembly driven by said cylinders and cooperating with the reduction assembly born by said bell element, for holding the plastics material on the mold.

The thermoforming method for thermoforming a sheet-like plastics material by using the inventive thermoforming station, which method also constituted a main aspect of the present invention, is characterized essentially by the fact that said method comprises a step of forming ventilating and cooling slots for said plastics material, by disassembling or opening said bell element, which is held clamped on said plastics material to hold the latter at a fixed position on the mold.

The thermoforming method according to the invention is moreover characterized in that it provides to form said openings by raising or detaching said movable panel from said side wall of said bell element. Further openings are formed by raising or detaching said side wall from said reduction assembly clamped on said plastics material adhering to said mold.

With respect to prior thermoforming stations, the thermoforming station of the invention provides the advantage of allowing a quicker and much more efficient cooling of the molded plastics material. Thus, the overall thermoforming operating time can be reduced up to 50% with respect to a conventional thermoforming time, i.e. the thermoforming time of prior apparatus, to provide an evenly molded product free of any inner stresses due to an excessively quick cooling.

Moreover, the thermoforming station according to the invention, being provided with a bell element free of windows, has a much more simple and reliable construction with comparatively low making costs and maintenance requirements.

BRIEF DESCRIPTION OF THE DRAWINGS

The above mentioned and yet other characteristics, objects and advantages of the invention will become more apparent hereinafter from the following detailed disclosure of preferred embodiments of the inventive thermoforming station, which have been illustrated, by way of a merely illustrative example, in the figures of the accompanying drawings, where.

DESCRIPTION OF THE PREFERRED EMBODIMENTS

Figure 1:
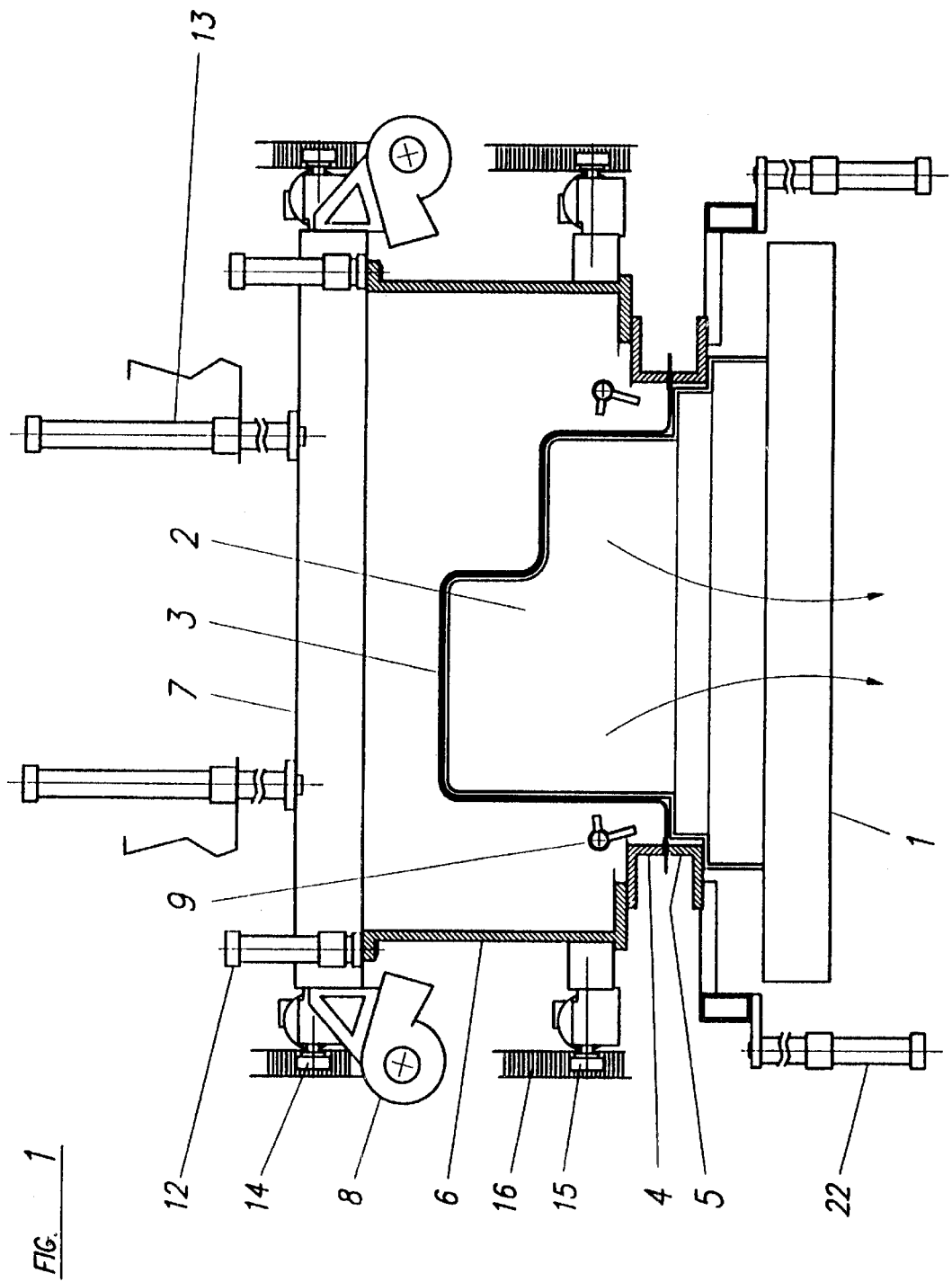
FIG. 1 shows a first embodiment of the thermoforming station according to the invention, in a cross-sectional view through a vertical plane.

The thermoforming station shown in FIG. 1 essentially comprises a movable panel 1 supporting a mold 2 which is closed at the top thereof by a bell construction or element 6-7, which will be disclosed in a more detailed manner hereinafter. In this connection, however, it should be pointed out that the mutual positions of the above mentioned parts could be different from the shown positions and, in particular, the mold 1 could be arranged in a reversed position from the shown position (the mold bearing panel 1 at the top and the bell element or construction 6-7 at the bottom).

Said bell element of the inventive thermoforming station comprises a side wall 6, patterned as the mold supporting panel 1 plan, and being closed at the top thereof by a closing cover 7, which also represents the movable panel for driving the bell element. To that end, the cover 7 comprises a plurality of cylinders 13, for raising the movable panel 7 and side wall 6 of the bell element.

Figure 5:
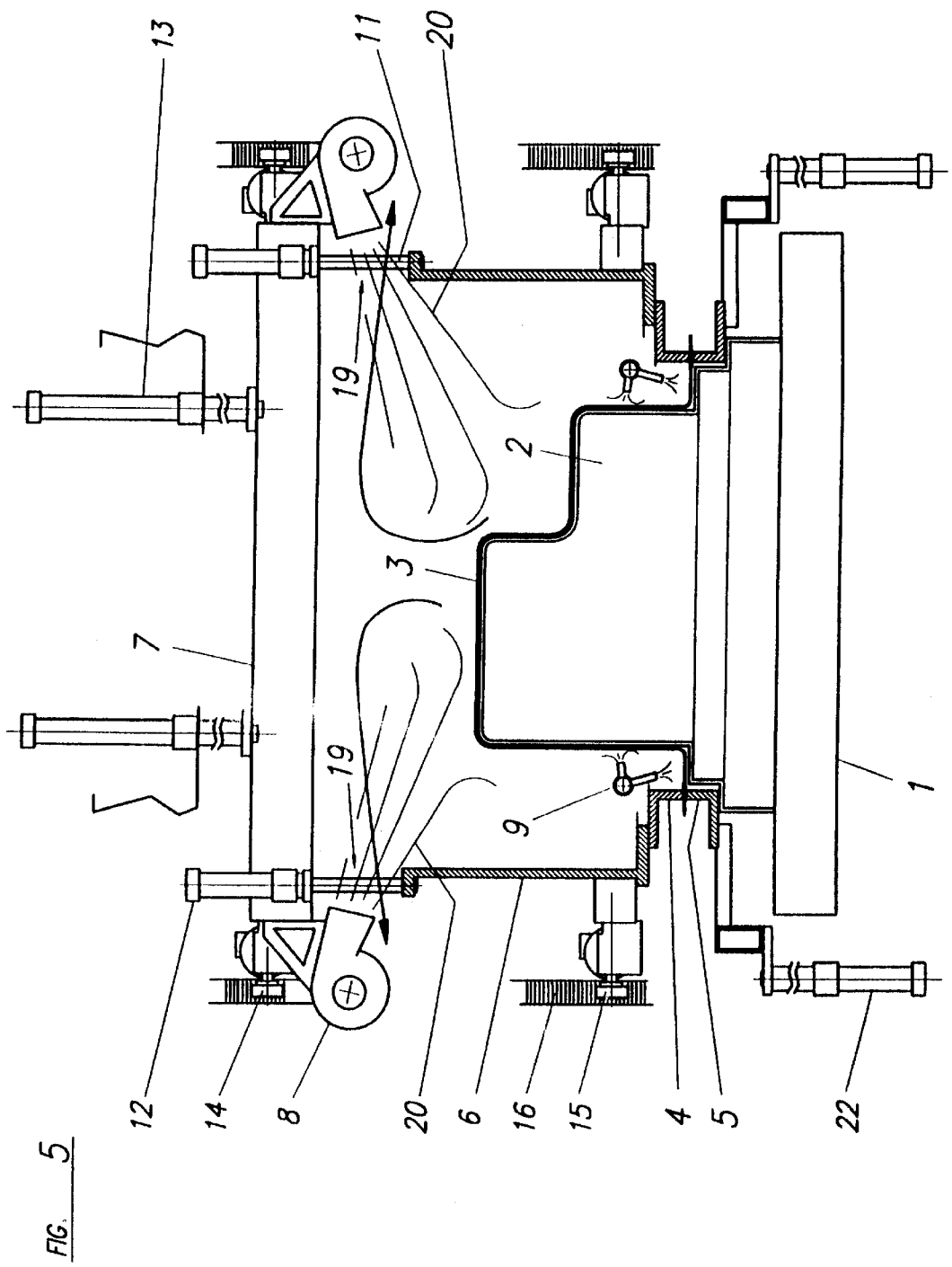
FIG. 5 shows a cooling step performed in the thermoforming station of FIG. 4.

As is clearly shown in FIG. 5, the movable panel 7 can be raised from the wall 6, while being held rigid therewith, in order to provide a large peripheral window 19. To that end, the movable panel 7 is provided with a plurality of driving cylinders 12, the pistons 11 of which connect the panel 7 to the edge portion of the wall 6 thereon said panel 7 must be closed. More specifically, the body of the cylinder 12 is anchored to the movable panel 7, whereas the piston 11 thereof has its free end portion coupled to the wall 6 of the bell element. Thus, as the cylinder 12 is driven, the piston 11 thereof will be extended, thereby raising or detaching the cover 7 from the sidewall 6.

An assembly of guide side elements 14 and 15 is moreover slidingly provided on corresponding vertical columns 16, preferably of a pinion-rack type, for perfectly centering the movement of the movable panel 7 and, respectively, of the side wall 6 with respect to one another and the mold 2.

A plurality of fans 8 for generating and orienting a plurality of air jets 20 inside said bell element are moreover coupled to said panel 7, and provided for operating in the raised position of said panel 7 from said wall 6, through the mentioned peripheral window 19.

On the edge of said sidewall 6 opposite to the movable panel 7 engagement edge thereof, is provided a reduction assembly 4 designed for cooperating with a corresponding reduction assembly 5, which can be driven by pistons 22, thereby holding the edge portion of a sheet-like plastics material 3 (in a plate or coil form) at a desired molding position (FIG. 1).

Advantageously (see FIG. 6) the side wall 6 of the bell element can be raised, with respect to the reduction assembly 4 held pressed on the plastics material 3, by a plurality of driving cylinders 17, substantially corresponding to the above disclosed cylinders 12. Even in this case, the cylinder piston rod is connected to the reduction assembly 4, which is held in its set position. The body of the cylinders 17, on the contrary, is connected to the side wall 6 of the bell element, thereby causing said side wall to be moved away from the reduction assembly 4. Thus, during the cooling step, a further ventilating peripheral opening 21 can be formed. The cooling of the molded plastics material is moreover improved owing to the provision of a conventional pressurized air channel pattern 9.

Figure 6:
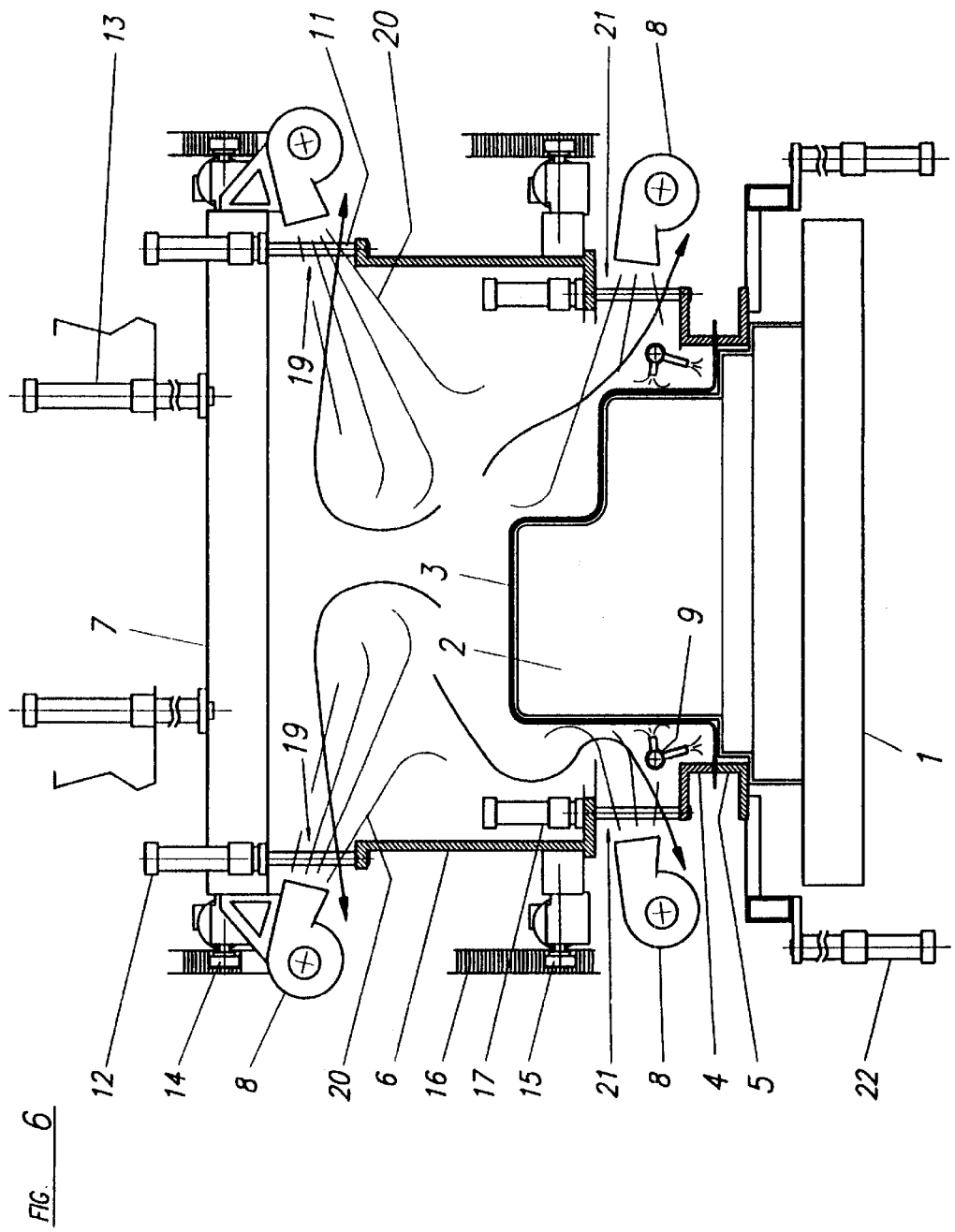
FIG. 6 shows a further cooling step performed according to a second embodiment of the inventive thermoforming station.
Figure 7:
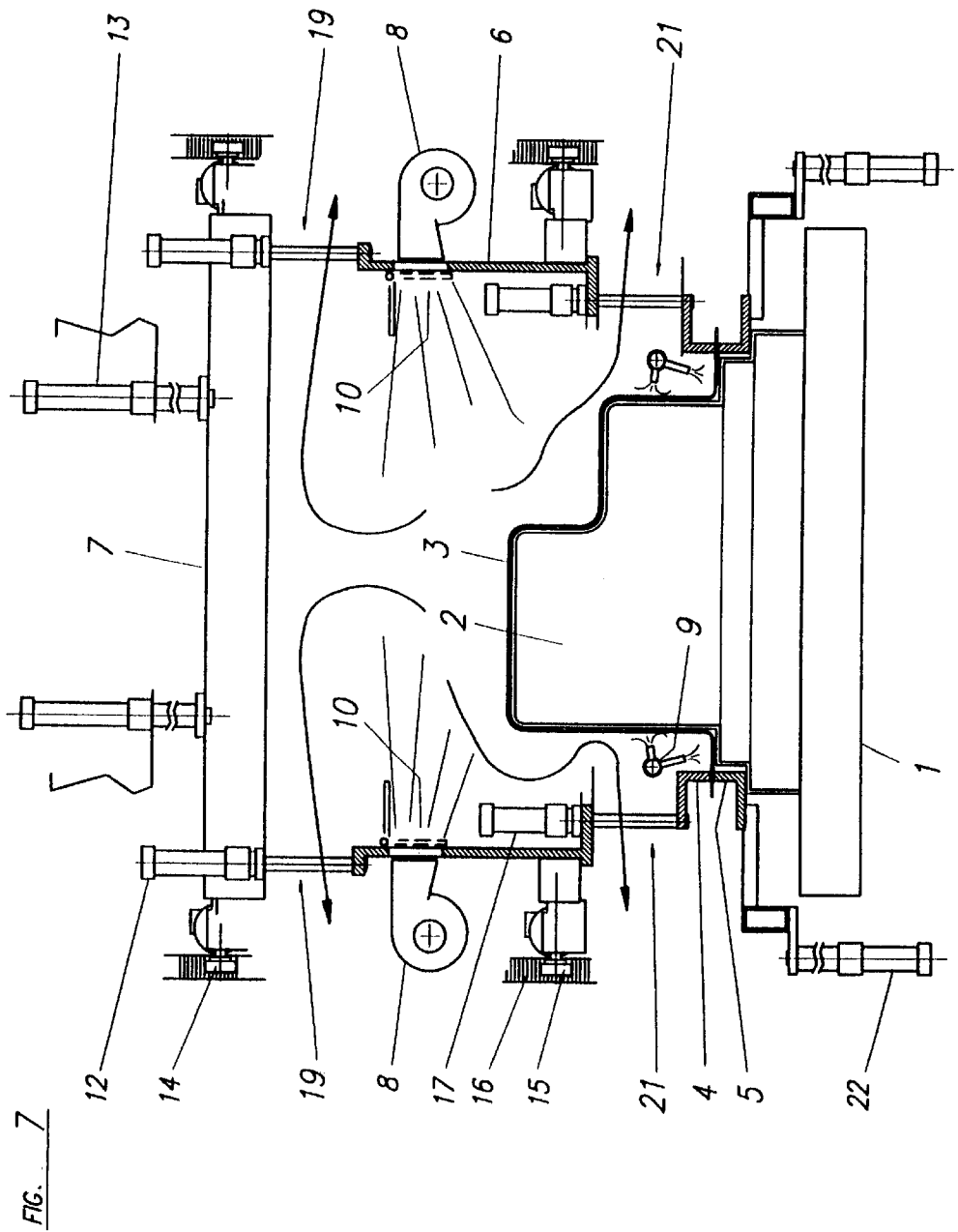
FIG. 7 shows a further cooling step performed according to a third modified embodiment of the inventive thermoforming station.
Figure 8:
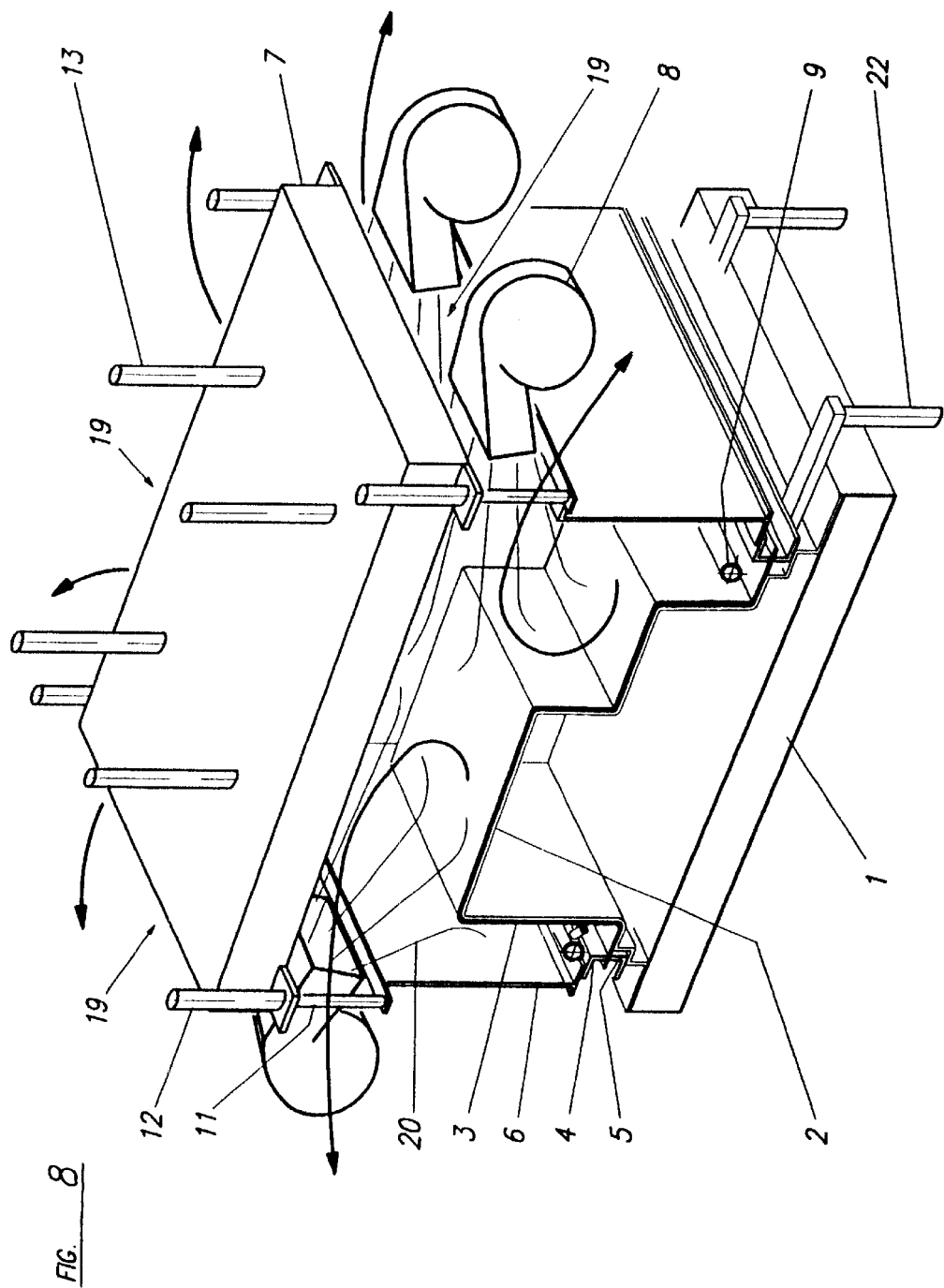
FIG. 8 is a perspective view showing, in exploded form, the thermoforming station of FIG. 6.

In the modified embodiment shown in FIG. 7, the thermoforming station of FIG. 6 has been moreover provided with a plurality of fans 8 arranged at a level of corresponding ports 10 in turn provided through side wall 6 of the bell element.

Figure 2:
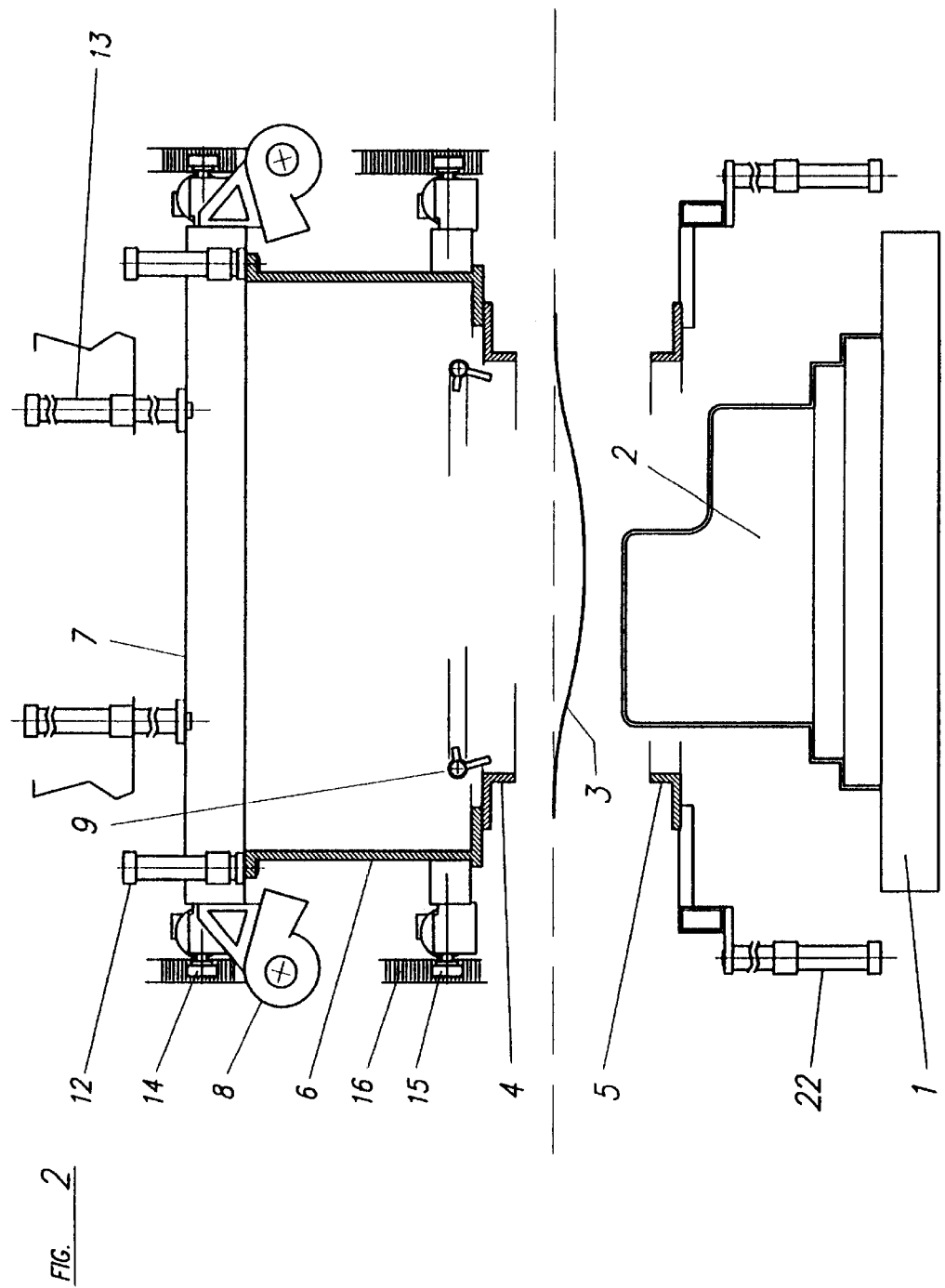
FIG. 2 shows the thermoforming station of FIG. 1, during the thermoforming method starting step.
Figure 3:
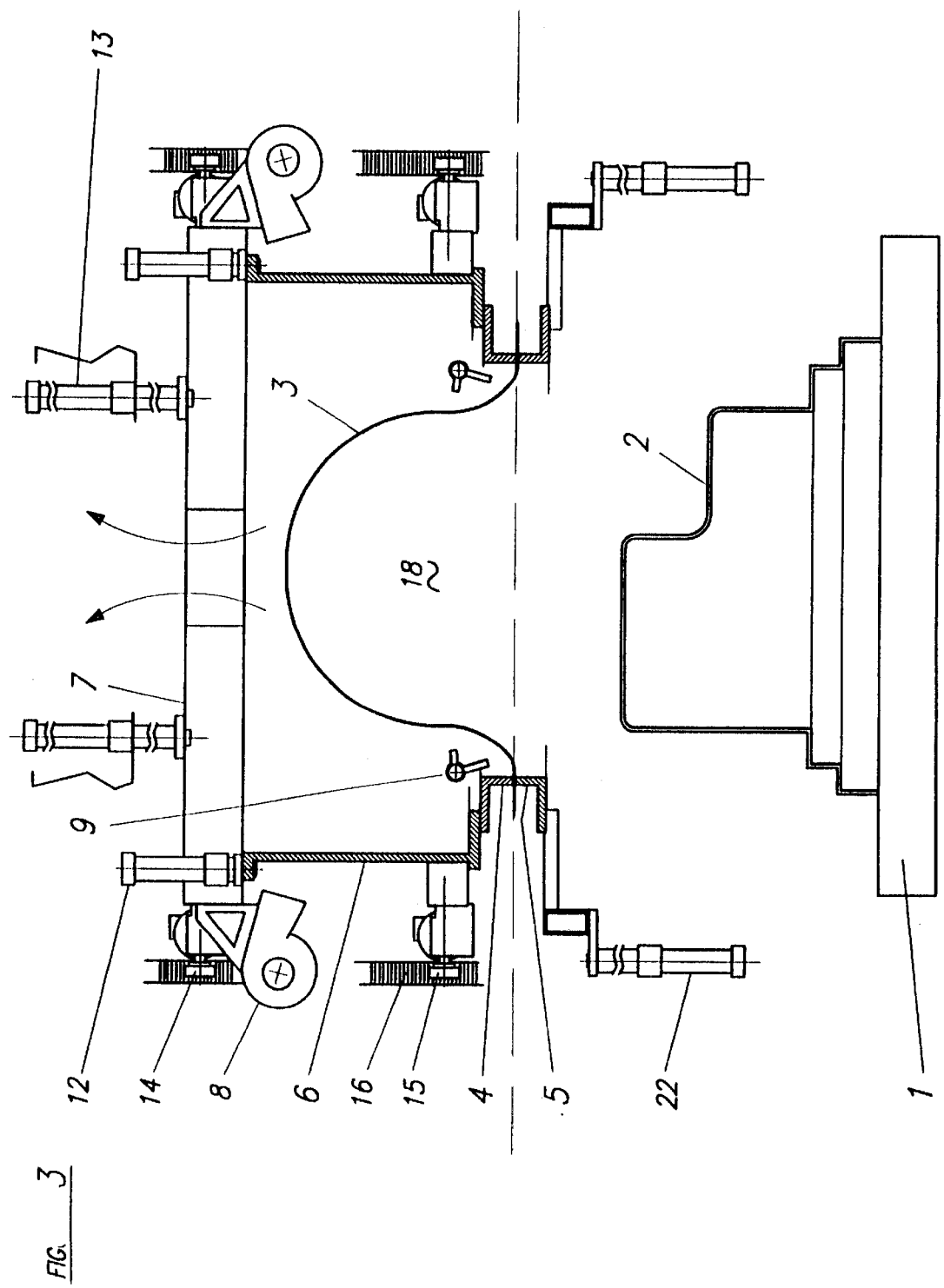
FIG. 3 shows the thermoforming station of FIG. 2, during a drawing method step in which a plastics material is drawn inside a bell element.
Figure 4:
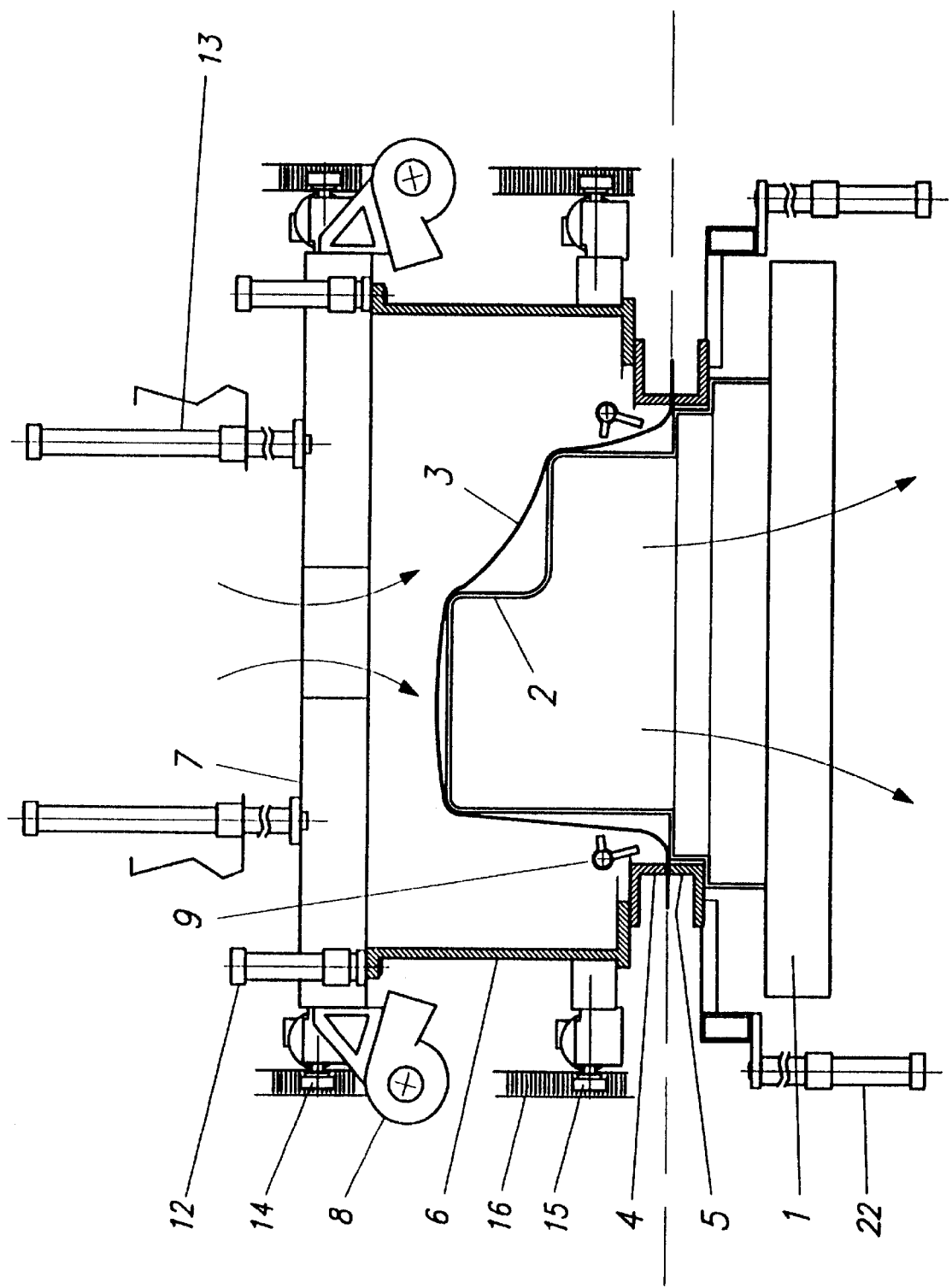
FIG. 4 shows the thermoforming station of FIG. 3 during a subsequent plastics material drawing step.

At the start of the molding method, the sheet-like plastics material 3, already brought to its plasticizing temperature, is arranged between the bell element 6-7 and the movable panel 1 supporting the mold 2 (FIG. 2). Then (FIG. 3) the reduction assemblies 4 and 5 are pressed against the perimeter of the plastics material 3, thereby locking it at its proper molding position, then, inside the bell element 6-7 air is sucked (in the direction of the arrows of FIG. 3) for forming a pre-stretching ball 18 of the plastics material 3. At this time, the mold bearing or supporting panel 1 is closed on the bell element 6-7, and air is further sucked in a direction opposite to the previous air sucking direction (with a possible pressurizing of the bell element, see the arrows in FIG. 4), thereby drawing the plastics material against the mold 2 for properly molding it (see FIG. 1). Then, the molded plastics material cooling step will be started, said cooling step being performed through the reduction assemblies 4 and 5 holding the plastics material 3 in its set position on the mold 2.

In particular, the mentioned cooling is performed, according to the invention, by raising or detaching the movable panel 7 from the sidewall 6 of the bell element (see FIG. 5), thereby providing a large perimetrical opening 19 therethrough the fans 8 will eject air jets 20 inside the bell element and through the outer surface of the plastics material or molded article 3. In this connection it should be pointed out that the hot air streams will exit through the same opening 19 (see the thickened arrows of FIG. 3).

According to the modified embodiment of FIG. 6, a like opening 21 can be advantageously formed also in the bottom of the bell element, by raising or detaching said sidewall 6 thereof from the reduction assembly 4, while holding it in a gripping relationship on the plastics material 3.

A further improved cooling, moreover, can be provided by the fans 8 which, in the modified embodiment shown in FIG. 7, are arranged at the level of the mentioned ports provided through the side wall 6 of the bell element.

Thus, owing to the invention (which, in the illustrated embodiments provides to form large openings 19, 21 at the hot regions inside the bell element), the cooling time can be reduced up to a 50% rate of the cooling time usually provided for cooling the molded articles in prior thermoforming stations. Thus, for example, for molding a home refrigerator cell starting from a sheet-like plastics material (supplied in pate or coil form), having a thickness of 4.5 mm, the thermoforming temperature will be about 140° C., and the plastics material would be cooled to at least 70° C. (a thermal gradient or jump of at least 70° C.). By using conventional thermoforming bells, i.e. fixed thermoforming bells, this cooling would be conventionally achieved in a time of 20–30 seconds. On the contrary, by using the thermoforming station according to the present invention, the mentioned temperature differential of 70° C. would be achieved in a time of 10–15 seconds, owing to the possibility of opening the bell to provide large cooled air circulation openings.

While the invention has been disclosed with reference to preferred embodiments thereof, it should be apparent that the disclosed embodiment are susceptible to several modifications and variations. Thus, for example, the bell element could be disassembled into portions of the construction thereof different from the disclosed portions thereby defining openings at different sections of said bell. Moreover, the driving means for opening or disassembling the bell could be different from the disclosed driving means, as well as the guide means and the number and arrangements of the disclosed fans.

What is claimed is:

1. A thermoforming station for molding a sheet plastics material, comprising a movable panel supporting a thermoforming mold and a bell encompassing said thermoforming mold, wherein said bell comprises a vertically movable horizontal closing cover supported on vertically movable vertical sidewalls, said vertically movable closing, cover being adapted to be raised from said vertically movable sidewalls so as to provide a first peripheral cooling and ventilating opening and said vertically movable sidewalls being adapted to be vertically raised to provide a second peripheral cooling and ventilating opening, said vertical sidewalls having first end portions against which said closing cover can be abutted and second opposite end portions connected to a reduction assembly which cooperates with a corresponding reduction assembly, first driving means for vertically reciprocally driving said closing cover to bring said bell from a closed position to a first open position with respect to a said mold, and second driving means for vertically reciprocally driving said vertical sidewalls to bring said bell from the first open position to a second open position with respect to said mold.

2. A thermoforming station according to claim 1, wherein in said closed position of said bell, said first and second driving means are disenergized thereby said closing cover abuts on said first end portions of said sidewalls and said sidewalls are in a lowered position abutting said reduction assembly.

3. A thermoforming station according to claim 1, wherein in said first open position, said first driving means are energized and said second driving means are disenergized, thereby said closing cover is raised from said first end portions of said sidewalls and said sidewalls are in a lowered position abutting said reduction assembly.

4. A thermoforming station according to claim 1, wherein in said second open position both said first and second driving means are energized thereby said closing cover is raised from said first portions of said sidewalls and said sidewalls are raised from said reduction assembly.

5. A thermoforming station according to claim 1, wherein said first and second driving means comprise a first cylinder-piston assembly connected to said movable closing cover and a second cylinder-piston assembly connected to said sidewalls.

6. A thermoforming station according to claim 1, wherein said thermoforming station comprises side guide elements slidably mounted on sliding pinion-rack columns for centering said movable panel and sidewalls with respect to one another and to said mold.

7. A thermoforming station according to claim 1, wherein said reduction assemblies are suitable for locking said plastics material on said mold.

8. A thermoforming station according to claim 1, wherein said thermoforming station comprises fan means for generating and orienting a plurality of air jets inside said bell, as said bell is in said first and second open positions.

9. A thermoforming station according to claim 1, wherein said thermoforming station comprises additional cooling and ventilating openings formed through said sidewalls of said bell.

10. A thermoforming station according to claim 1, wherein said thermoforming station comprises a pressurized air channel pattern arranged inside said bell for further cooling said plastics material.

* * * * *